May 26, 1942.  W. S. PARDOE  2,284,013
VENTURI TUBE OR METER
Filed June 7, 1940
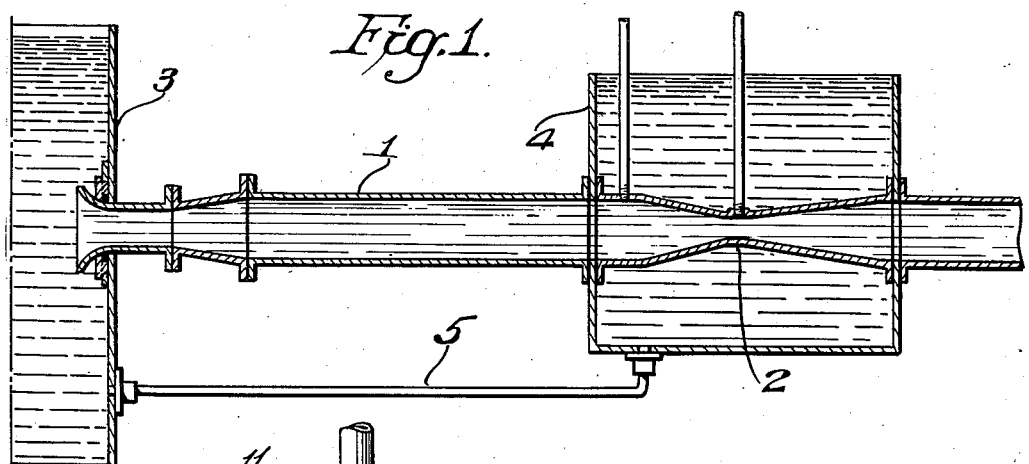
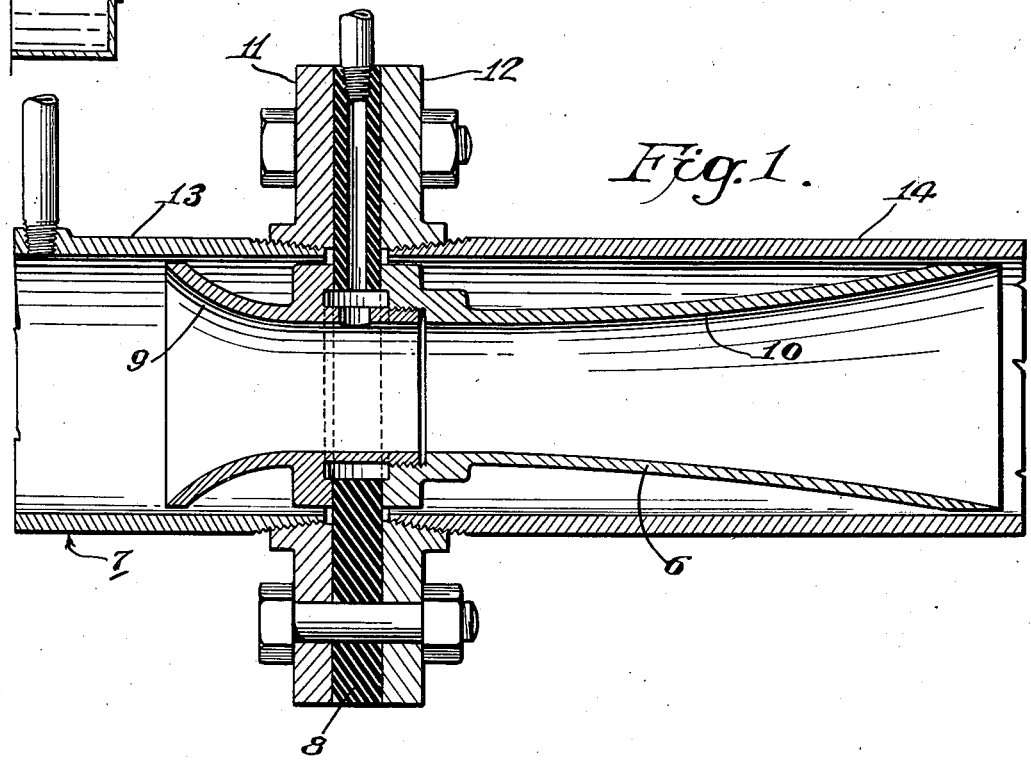
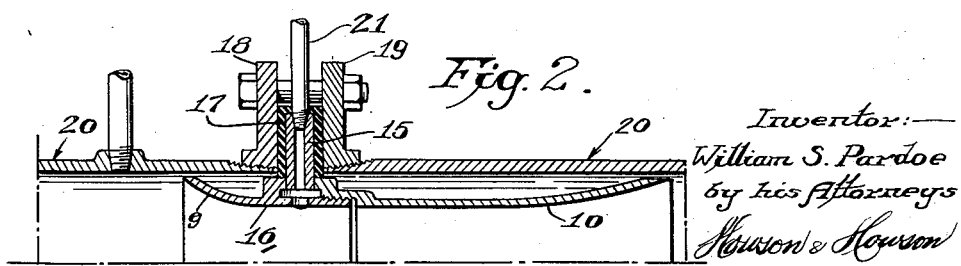
Inventor:—
William S. Pardoe
by his Attorneys
Howson & Howson Patented May 26, 1942

2,284,013

UNITED STATES PATENT OFFICE 2,284,013

VENTURI TUBE OR METER

William S. Pardoe, Merion, Pa.

Application June 7, 1940, Serial No. 339,402

2 Claims. (Cl. 73—213)

This invention relates to improvements in Venturi tubes or meters, and a principal object is to provide a device of this character which will exhibit improved functional characteristics as hereinafter more fully set forth.

More specifically, an object of the invention is to provide means, applicable to Venturi tubes in general, which will operate to bring the tube into close conformity with Reynold's number irrespective of variable conditions under which the tube may be required to function.

I have found that in the use of Venturi tubes of conventional form, there is a considerable inaccuracy arising from heat transfer between the throat of the tube and the external atmosphere. These inaccuracies are demonstrated, for example, by failure of the tube to follow Reynold's number as expressed by the formula:

$$R = \frac{Vd\rho}{\mu}$$

where
$V$=velocity of the fluid at the throat
$d$=diameter of the throat
$\rho$=density of the fluid
$\mu$=viscosity of the fluid.

I have found further that the degree or extent of departure from the aforesaid number bears a direct relation to temperature differential between the fluid passing through the tube and the atmosphere surrounding the tube; and it is apparent, therefore, that a tube which is subject to variable temperature conditions will necessarily be lacking in functional uniformity.

I have discovered that the aforesaid inaccuracies may be substantially eliminated by provision of adequate means for insulating the throat of the tube against transfer of heat to or from an external source, whereby the temperature of the throat may remain constant at or about the temperature of the transmitted fluid. A tube thus insulated will follow Reynold's number with a relatively high degree of accuracy and uniformity.

Various means may be employed to effect the aforedescribed insulation, and in the attached drawings:

Fig. 1 is a sectional view illustrating a universally applicable insulating means; and Fig. 2 is a fragmentary sectional view illustrating a modification within the scope of the invention.

In the embodiment shown in Fig. 1, a Venturi tube 6, made of metal in accordance with the conventional practice, is located in the conduit 7 by means of an annular element 8 of thermal insulating material, the inner peripheral portion of said element being solidly clamped between the two separable sections 9 and 10 of the tube 6, and the more radially remote portions of the said element being similarly solidly clamped between the flanges 11 and 12 by means of which the sections 13 and 14 of the conduit 7 are secured together. The element 8 functions in this case to thermally insulate the tube 6 not only from the conduit 7, but also from the sources such as atmospheric air external to the conduit. By reason of this insulation, variations in the temperature of the atmospheric air or differential between the temperature of the fluid passing through the duct 7 and the atmospheric air are prevented from materially affecting the temperature of the throat 6, which remains substantially constant. Element 8 is provided with a channel forming a passage for conducting fluid pressure at the throat of venturi 6 to a differential pressure measuring device.

In the embodiment shown in Fig. 2, the flange 15, which is attached to the Venturi tube 16 and corresponds to the annular element 8 of the previously described embodiment, is made of metal. An annular insulating element 17 is interposed between the flange 15 and the clamping flanges 18 and 19 of the conduit 20, and this insulating element also embraces the peripheral surface of the flange 15 and insulates the latter from the atmosphere. Flange 15 is formed with a passage to which tube 21 is connected to convey fluid pressure from the throat of Venturi tube 16 to a differential pressure measuring device. While in this instance there is a path for conductive transfer of heat between the tube 16 and the atmosphere by way of the tube 21, the relatively great length and small area of the path precludes any substantial heat transfer.

It will be apparent that the invention is capable of numerous other embodiments.

I claim:

1. The combination with a conduit, of a Venturi tube, and means secured to and forming a support for said tube within the conduit and comprising a channel forming a passage to the tube from the exterior of the conduit, said means having low thermal conductivity so as to insulate the tube against exchanges of heat with sources external to the conduit.

2. The combination with a conduit, of a Venturi tube, means secured to and forming a support for said tube within the conduit and comprising a channel forming a passage to the tube from the exterior of the conduit, and means of low thermal conductivity forming an envelope for said supporting means so as to insulate the latter against direct exchanges of heat with the conduit and the surrounding atmosphere.

WILLIAM S. PARDOE.